US012602984B2

(12) United States Patent
Cheikh

(10) Patent No.: US 12,602,984 B2
(45) Date of Patent: Apr. 14, 2026

(54) METHOD FOR DETECTING PRESENCE INSIDE A LOCKED VEHICLE AND ASSOCIATED DETECTION DEVICE

(71) Applicant: Continental Automotive Technologies GmbH, Hannover (DE)

(72) Inventor: Mohamed Cheikh, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 34 days.

(21) Appl. No.: 18/717,629

(22) PCT Filed: Nov. 24, 2022

(86) PCT No.: PCT/EP2022/083165
§ 371 (c)(1),
(2) Date: Jun. 7, 2024

(87) PCT Pub. No.: WO2023/110357
PCT Pub. Date: Jun. 22, 2023

(65) Prior Publication Data
US 2025/0046176 A1     Feb. 6, 2025

(30) Foreign Application Priority Data

Dec. 16, 2021     (FR) ...................................... 2113613

(51) Int. Cl.
G08B 21/22          (2006.01)
G01S 13/02          (2006.01)
(Continued)

(52) U.S. Cl.
CPC .......... G08B 21/22 (2013.01); G01S 13/0209 (2013.01); G01S 13/87 (2013.01); G08B 21/24 (2013.01)

(58) Field of Classification Search
CPC ...... G01S 13/0209; G01S 13/87; G01S 13/04; G01S 13/931; G08B 21/22; G08B 21/24; G08B 13/187
See application file for complete search history.

(56) References Cited

U.S. PATENT DOCUMENTS 11,789,135 B2 * 10/2023 Zeng .................... G01S 13/0209
                                                       342/27
12,044,767 B2 * 7/2024 Nosthoff ................. H04W 4/46
                        (Continued)

FOREIGN PATENT DOCUMENTS

DE          102015216212 A1      3/2017
EP              3742195 A1      11/2020
                        (Continued)

OTHER PUBLICATIONS

International Preliminary Report on Patentability issued on Oct. 12, 2023, by République Française, INPI, France, in corresponding Application No. FR2302953, with machine translation. (17 pages).
(Continued)

*Primary Examiner* — Sisay Yacob
(74) *Attorney, Agent, or Firm* — Buchanan Ingersoll & Rooney P.C

(57)          ABSTRACT

A method for detecting presence by ultra-wideband inside a locked vehicle, by a detecting device including at least one internal module and at least two external modules. The method including: a) detection of locking; b) for a first period of time, alternation of transmission by the internal module of waves at various predetermined frequencies and powers and simultaneous transmission of waves by a first external module; c) reception, by the internal module, of reflected waves; d) reception, by a second external module, of waves transmitted by the first external module; e) comparison between the waves received by the internal module
(Continued)

and by the external module; and f) in case of simultaneous detection by both modules of an event, then detection of presence inside the vehicle.

13 Claims, 5 Drawing Sheets

(51) Int. Cl.
  G01S 13/87 (2006.01)
  G08B 21/24 (2006.01)

(56) References Cited

U.S. PATENT DOCUMENTS

| | | |
|---|---|---|
| 2018/0188025 A1 | 7/2018 | Cyllik et al. |
| 2019/0143944 A1 | 5/2019 | Park |
| 2020/0189328 A1 | 6/2020 | Kretschmann et al. |
| 2020/0309932 A1* | 10/2020 | Zeng ......................... G07C 5/08 |
| 2021/0389442 A1* | 12/2021 | Nosthoff ................. G01S 5/021 |

FOREIGN PATENT DOCUMENTS

| | | |
|---|---|---|
| JP | 2007153034 A | 6/2007 |
| JP | 2015217713 A | 12/2015 |
| WO | 2019238575 A1 | 12/2019 |

OTHER PUBLICATIONS

International Search Report (PCT/ISA/210) with translation and Written Opinion (PCT/ISA/237) mailed on Mar. 10, 2023, by the European Patent Office as the International Searching Authority for International Application No. PCT/EP2022/083165. (15 pages).

Khan, et al, "A Detailed Algorithm for Vital Sign Monitoring of a Stationary/Non-Stationary Human through IR-UWB Radar", Department of Electronics and Computer Engineering, Hanyang University, Seoul Korea, Feb. 4, 2017. pp. 1-15.

Leem et al, "Vital Sign Monitoring and Mobile Phone Usage Detection Using IR-UWB Radar for Intended Use in Car Crash Prevention", Department of Electronics and Computer Engineering, Hanyang University, Seoul Korea, May 30, 2017, pp. 1-25.

* cited by examiner

METHOD FOR DETECTING PRESENCE INSIDE A LOCKED VEHICLE AND ASSOCIATED DETECTION DEVICE

CROSS REFERENCE TO RELATED APPLICATIONS

This application is the U.S. National Phase Application of PCT International Application No. PCT/EP2022/083165, filed Nov. 24, 2022, which claims priority to French Patent Application No. 2113613, filed Dec. 16, 2021, the contents of such applications being incorporated by reference herein.

FIELD OF THE INVENTION

The invention relates to a method for detecting presence inside a vehicle that has been locked beforehand and to an associated detecting device. The invention is particularly applicable to detecting young children, or a baby that might have been forgotten on the rear seats when the driver left and locked the vehicle.

BACKGROUND OF THE INVENTION

New automotive standards are emerging that now require manufacturers to detect a child aged 0-6 years in a vehicle, for a period of 10 seconds after the vehicle has been locked—this is for example the case with the "Euro NCAP" standard. This standard is broken down into three levels: a first level that triggers the horn and switches on the headlights of the vehicle in case of detection; a second level that causes a notification to be sent to the telephone of the driver; and, lastly, a third level that causes an emergency call or "e-call" to be sent by the vehicle.

In order to warn the driver of the presence of a young child or baby on a rear seat of a motor vehicle, several prior-art methods or devices are known.

Most methods use dedicated sensors, for example a sensor on the rear seat belt, which detects that the belt is fastened, or infrared or radar sensors for detecting the presence of an "object" on the rear seat, supplemented by detection of a breathing movement, or else sensors located under the rear seat that detect a weight.

However, the drawback of these dedicated sensors lies in the extra cost they add to the vehicle.

It is also known to use sensors that already exist in the vehicle, for example ultra-wideband (UWB) frequency transceivers, which are located in the vehicle in order to allow the vehicle to be accessed "hands-free" and/or the vehicle to be started "hands-free". These sensors are then used to detect the breathing movement, i.e. the heart rate, of a human located in the vehicle.

The advantage of using ultra-wideband lies in the frequency of the transmitted waves, which allows the waves to penetrate through clothing.

However, there are many drawbacks to using ultra-wideband frequencies:

a. the level of the reflected signal is low because it is sensitive to the environment-if there is a movement outside the vehicle for example, this movement may disrupt the reflected signal;

b. to validate detection, the acquisition time of the reflected signal may sometimes need to exceed the 10 seconds allowed by the "Euro NCAP" standard to raise an alarm and reach 20 seconds, which is unacceptable;

c. the position and orientation of the subject in respect of whether the ultra-wideband antennas are positioned to achieve a so-called "direct" path, i.e. one without obstacles or reflection, or a so-called "indirect" path, i.e. one with obstacles and/or reflections, have a direct impact on the quality of the reflected signal;

d. environmental factors such as rain, snow, vehicle vibrations, or even temperature, have an impact on the performance of ultra-wideband presence detection.

SUMMARY OF THE INVENTION

An aspect of the invention therefore provides a detecting method and a detecting device that overcome the drawbacks of the prior art, in particular by improving the accuracy of detection and by reducing the number of false alarms.

An aspect of the invention provides a method for detecting presence inside a locked vehicle, by means of a detecting device comprising at least one internal ultra-wideband transceiver module able to transmit toward inside the vehicle and at least two external ultra-wideband transceiver modules able to transmit toward outside the vehicle, said method being noteworthy in that it comprises the following steps:

a. detection of locking of the vehicle, b. for a predetermined first period of time, alternation of transmission by the internal module of waves at various predetermined frequencies and at various associated predetermined powers, and simultaneous transmission of waves by a first external module, c. reception, by said internal module, of reflected waves, d. reception, by a second external module, of waves transmitted by said first external module, e. comparison between the reflected waves received by the internal module and the waves received by the second external module, f. in case of simultaneous detection by the internal module and by the second external module of an event, then detection of presence inside the vehicle using the reflected waves of the internal module from which the waves corresponding to the detected event are subtracted.

Judiciously, the simultaneous detection of an event corresponds to detection by the internal module and by the second external module of a wave variation at the same time.

Advantageously, transmission by the internal module is repeated at various predetermined power values and at various associated predetermined frequency values and the comparison is performed only for waves transmitted at maximum power values.

In case of absence of detection, the method is repeated with transmission of waves by the internal module for a second predetermined period of time longer than the first predetermined period of time, and only at a maximum power value.

In one embodiment of the invention, the transmission of waves by the external module is carried out at a power equal to the transmission power of the internal module.

In one refinement of the invention, the method also comprises simultaneous transmission by a second external module of waves and reception by the first external module of the waves thus transmitted and the comparison is made between the reflected waves received by the internal module and a sum consisting of the waves received by the first external module and of the waves received by the second external module.

An aspect of the invention also applies to a device for detecting presence inside a vehicle comprising at least one internal ultra-wideband transceiver module able to transmit toward inside the vehicle and at least two external ultra-wideband transceiver modules able to transmit toward outside the vehicle, the device being noteworthy in that said at least one internal module and said at least two external modules are each able to determine a profile of received waves, in that the internal module is able to alternate transmission of waves at various predetermined power and frequency values and in that the device further comprises:

a. means for detecting locking of the vehicle, b. means for synchronizing transmission by the internal module and transmission by at least a first external module, c. means for making a comparison between waves received by the internal module and waves received by at least a second external module, d. means for detecting presence inside the vehicle depending on the result of the comparison.

Preferably, the predetermined frequency values are minimum and maximum frequency values and the predetermined power values are minimum and maximum power values.

In one embodiment, the device further comprises a plurality of external modules and means for summing the waves received by the external modules and the comparison-making means compare the waves received by the internal module with a sum of the waves received by the external modules.

An aspect of the invention also relates to any computer program product, characterized in that it comprises a set of program-code instructions that, when they are executed by one or more processors, configure the one or more processors to implement a method according to any one of the features listed above.

Finally, an aspect of the invention applies to any motor vehicle comprising a detecting device according to any one of the features listed above.

BRIEF DESCRIPTION OF THE DRAWINGS

Further features and advantages of aspects of the invention will become more clearly apparent on reading the following description. This description is purely illustrative and should be read with reference to the appended drawings, in which.

DETAILED DESCRIPTION OF THE PREFERRED EMBODIMENTS

Figure 1:
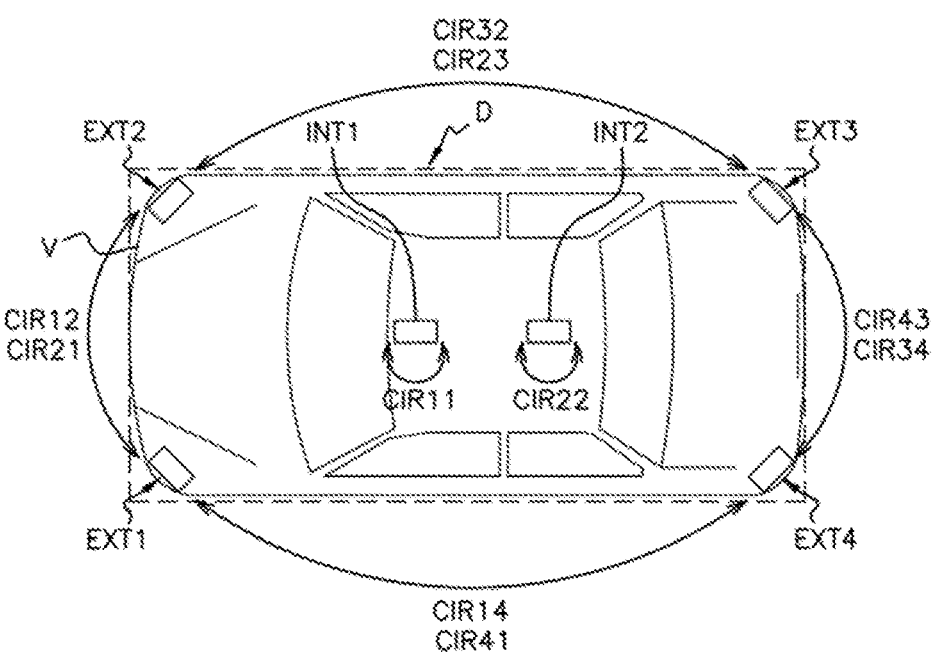
FIG. 1 is a schematic representation of a motor vehicle equipped with the device for detecting presence according to an aspect of the invention.

FIG. 1 shows a motor vehicle V equipped with a device D for detecting presence inside a locked vehicle according to an aspect of the invention.

The device D comprises:

a. at least one internal transceiver module INT1, INT2 for communicating in ultra-wideband, which is able to transmit waves directed toward inside the vehicle V;

b. at least two external transceiver modules EXT1, EXT2, EXT3, EXT4 for communicating in ultra-wideband, which are able to transmit waves directed toward outside the vehicle V.

Said internal modules INT1, INT2 and external modules EXT1, EXT2, EXT3, EXT4 allow the vehicle to be accessed "hands-free" and/or the vehicle V to be started "hands-free", and allow communication with a "hands-free" access device such as a keycard or smartphone (not shown in FIG. 1).

These internal and external modules are equipped with at least one ultra-wideband antenna and with a transceiver able to transmit and receive ultra-wideband waves, i.e. waves corresponding to pulses of very short duration, of a few nanoseconds, in a high frequency band of width ranging from 500 MHz to 1 GHz.

By ultra-wideband (UWB), what is meant is a frequency band preferably between 3.1 GHz and 10.6 GHz spanning a frequency range that is preferably of 500 MHz. This is known to those skilled in the art and will not be described in more detail here.

Solely for explanatory purposes, a device D comprising two internal modules INT1, INT2 and four external modules EXT1, EXT2, EXT3 and EXT4 will be considered by way of example of embodiment.

The detecting device D further comprises means M1 for processing the received waves. For example, each module INT1, INT2, EXT1, EXT2, EXT3, EXT4 may comprise processing means M1 or alternatively a central electronic unit 10 connected to said modules may comprise these processing means. These processing means M1 preferably, but non-limitingly, take the form of software means allowing a parameter called the channel impulse response (CIR), i.e. a profile of the waves received by said module sampled as a function of time t, to be determined. It will be noted that either the amplitude of the CIR or the phase of the CIR may be used. In this example, the frequency-domain measurements of the received waves are transformed via inverse Fourier transform in order to generate values in units of time. The amplitude of the CIR consists in the absolute value of the real and imaginary parts of the values in units of time. The phase of the CIR consists in the arctangent of the ratio of the imaginary part divided by the part of the values in units of time. The calculation of the amplitude or phase of the CIR is well known to those skilled in the art and will not be detailed further here. In the example in question, the parameter considered is the amplitude of the CIR, but an aspect of the invention may be applied, mutatis mutandis, considering the phase of the CIR. The processing means M1 also comprise a clock H allowing the CIR amplitude or phase as a function of time t to be determined. As detailed below, the clock H is initiated when waves are transmitted by the internal modules or by the external modules.

Thus each module INT1, INT2, EXT1, EXT2, EXT3, EXT4 is able to determine the CIR profile of the waves that it receives as a function of time t.

To this end, and as specified above, each module is equipped with a clock H or is synchronized with a clock H that is initiated when waves are transmitted by said module. The start time of the measurement of time t corresponds to the time of transmission of the waves by said module. This is known to those skilled in the art.

According to an aspect of the invention, the internal modules INT1, INT2 are also able to transmit ultra-wideband (UWB) waves at various frequencies and at various predetermined frequencies.

The detecting device D also comprises:

a. means M0 for detecting locking of the vehicle, b. means M2 for synchronizing transmission by at least one internal module INT1, INT2 and transmission by at least a first external module EXT1, EXT2, EXT3, EXT4, c. means M3 for making a comparison between the waves received, and more precisely between a CIR profile of waves received, by the internal module INT1, INT2 and the waves received, and more precisely a CIR profile of waves received, by a second external module EXT1, EXT2, EXT3, EXT4, d. Means M4 for validating detection of presence in the passenger compartment of the vehicle depending on the result of the comparison.

In one refinement of the invention, the detecting device D comprises a plurality of external modules, and means M5 for summing the waves received by the external modules.

The processing means M1, the detecting means M0, the synchronizing means M2, the comparison-making means M3 and the validating means M4 may take software form, and be entirely or partly located in each of the modules or alternatively in the central electronic unit 10.

In one preferred embodiment of the invention, the internal modules INT1, INT2 are able to transmit waves while alternating between various predetermined frequency and power values, and more precisely between minimum and maximum power values Pmin, Pmax and minimum and maximum frequency values Fmin, Fmax.

The applicant has observed that the power values P and frequency values F of ultra-wideband transmission have an impact on the reliability and accuracy of detection of presence inside the passenger compartment of the vehicle V, as will be detailed below.

Figure 3:
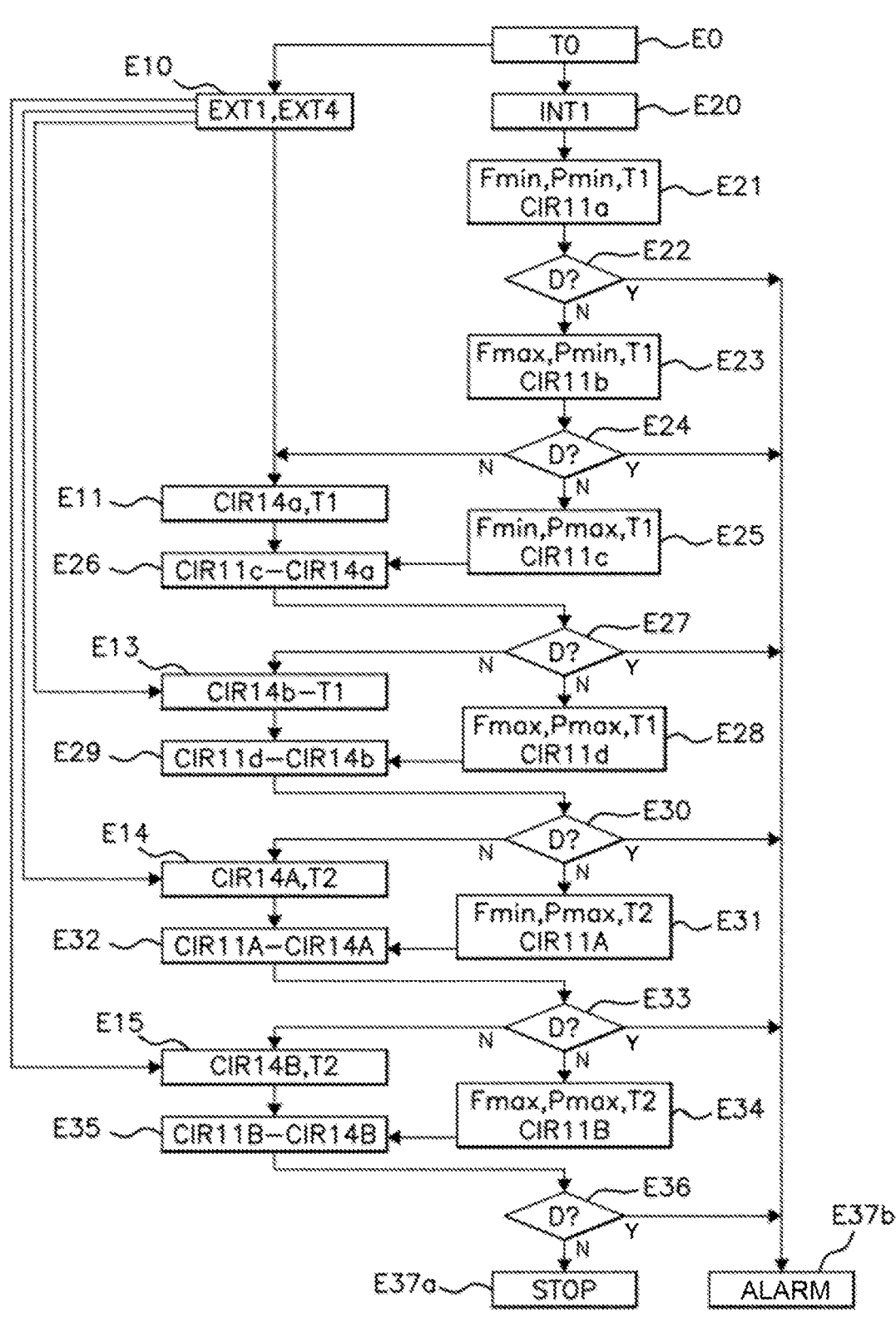
FIG. 3 is a flowchart showing the detecting method according to an aspect of the invention, FIG. 4 schematically shows the detecting device according to an aspect of the invention.
Figure 4:
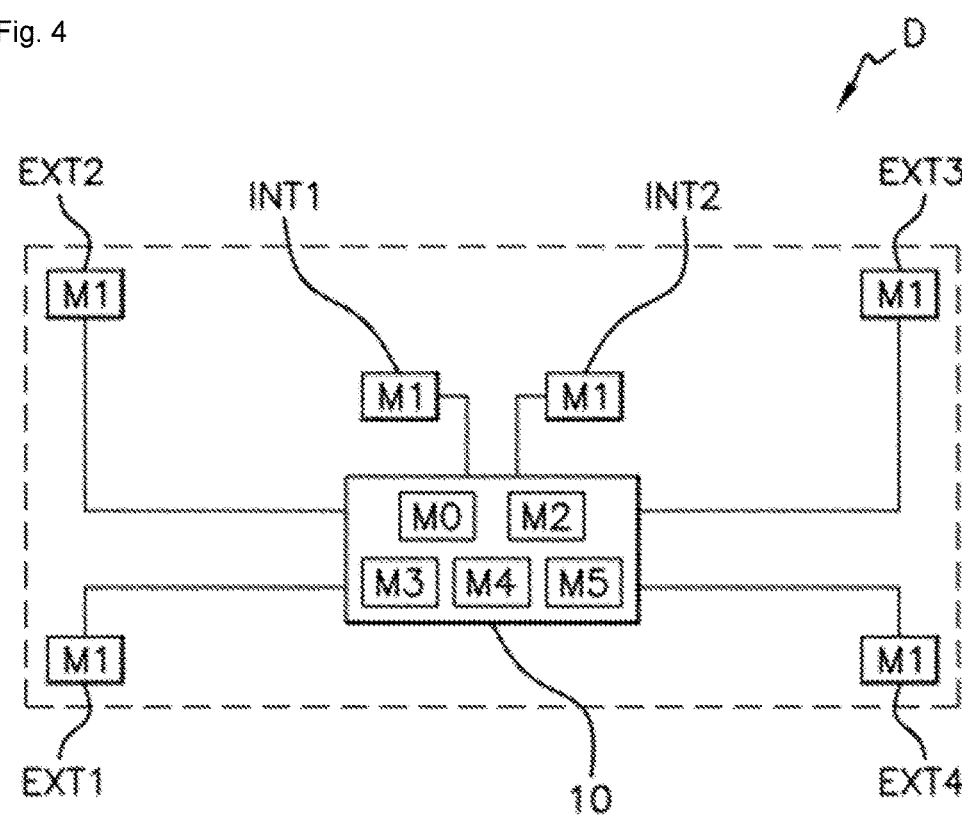

The method for detecting presence inside a vehicle will now be described using the flowchart of FIG. 3.

In a first step E0, it is detected at the time TO that the vehicle is locked. This detection is carried out by the vehicle, by way of the door locking system—this is known in the prior art and will not be detailed here.

Said detection of locking then initiates activation of the internal module INT1 (step E20) and of the two external modules EXT1, EXT4 (step E10) according to the detecting method of an aspect of the invention.

In a first step E21, the internal module INT1 transmits for a predetermined first period of time T1 (for example T1 is equal to 500 ms) UWB waves at a predetermined first frequency value, for example a minimum frequency value Fmin, equal to 3.1 GHZ, and at a predetermined first power value, for example a minimum power value equal to −42 dBm. Said waves are transmitted then reflected inside the vehicle, and the first internal module INT1 receives in return reflected waves from which it extracts a profile CIR11a.

If said profile CIR11a contains peaks representative of the presence or movement of a child in the passenger compartment, then the detection of presence is validated (step E22) and an alarm is raised (step E37b). This alarm may take various forms: the user may receive a message on her or his smartphone, or the horn or headlights of the car may be triggered or indeed an e-call may be made by the vehicle, if it has this functionality. Peaks representative of the presence or movement of a child are peaks the profile of which or typical values of which have been predetermined beforehand. The profile CIR11 is compared to said profiles in order to determine whether it contains a peak profile representative of the presence or movement of a child in the passenger compartment.

If the profile CIR11a does not contain peaks representative of the presence or movement of a child in the passenger compartment, then step E21 is repeated but this time at a different frequency, for example at a maximum frequency equal to 10.6 GHz but still at the minimum power of −42 dBm (step E23). The internal module INT1 therefore transmits waves at the maximum frequency and at the minimum power for the predetermined period of time T1. The first internal module INT1 receives in return reflected waves from which it extracts a profile CIR11b.

If the profile CIR11b contains peaks representative of the presence or movement of a child in the passenger compartment, then the detection of presence is validated (step E22) and an alarm is raised (step E37b).

If the profile CIR11b does not contain peaks representative of the presence or movement of a child in the passenger compartment, then steps E21 and E23 are repeated but this time with a maximum power value Pmax equal to −38 dBm.

The applicant has observed that different frequency values Fmin, Fmax and power values Pmin, Pmax allow the accuracy of detection of presence inside the passenger compartment to be improved.

More precisely, a minimum ultra-wideband transmission frequency value Fmin makes it possible to successfully detect a "large" movement, i.e. a movement or motion of large amplitude, of the order of a few centimeters per second—the movement of an arm or a leg for example. By successfully detect, what is meant is detection achieved with a high degree of reliability. In contrast, a maximum ultra-wideband transmission frequency value Fmax makes it possible to detect a movement that is said to be "small", i.e. a movement or motion of small amplitude, of the order of a few millimeters per second-a rib-cage movement due to breathing for example.

Thus, a minimum frequency value Fmin does not allow a "small" movement to be successfully detected and a maximum frequency value Fmax does not allow a "large" movement to be successfully detected.

However, a minimum frequency value Fmin has the advantage of a high degree of penetration into, for example, the fabrics or clothing worn by children.

As for power, a minimum ultra-wideband power value Pmin or a minimum ultra-wideband reception sensitivity means a detection area of smaller size in the passenger compartment. However, the drawbacks of a low transmission power Pmin are the low power also of the reflected wave, and the high sensitivity of the transmitted and reflected wave to obstacles. Thus, if the child is hidden behind an obstacle located on the path of the wave, i.e. on a so-called "indirect" path, she or he will not be detected.

A maximum ultra-wideband power value Pmax or a maximum ultra-wideband reception sensitivity means a large detection area in the passenger compartment, a high reflected-wave power, and lower wave sensitivity to obstacles than achieved with a low power value Pmin. However, the drawbacks of a high transmission power Pmax are, for example, a higher sensitivity to events outside the vehicle. Thus, the reflected wave, when transmitted at maximum power, includes reflections due to obstacles or movements inside the vehicle V but also due to obstacles or movements located outside the vehicle V.

The detecting method judiciously proposes to alternate transmission by the internal modules of waves with different power and frequency values, in order to combine the advantages of each of these parameters. In this example, two power values Pmin, Pmax and two frequency values Fmin, Fmax are considered, thus meaning there are four pairwise combinations of a power and frequency value, as shown in table 1 below.

Figure 2:
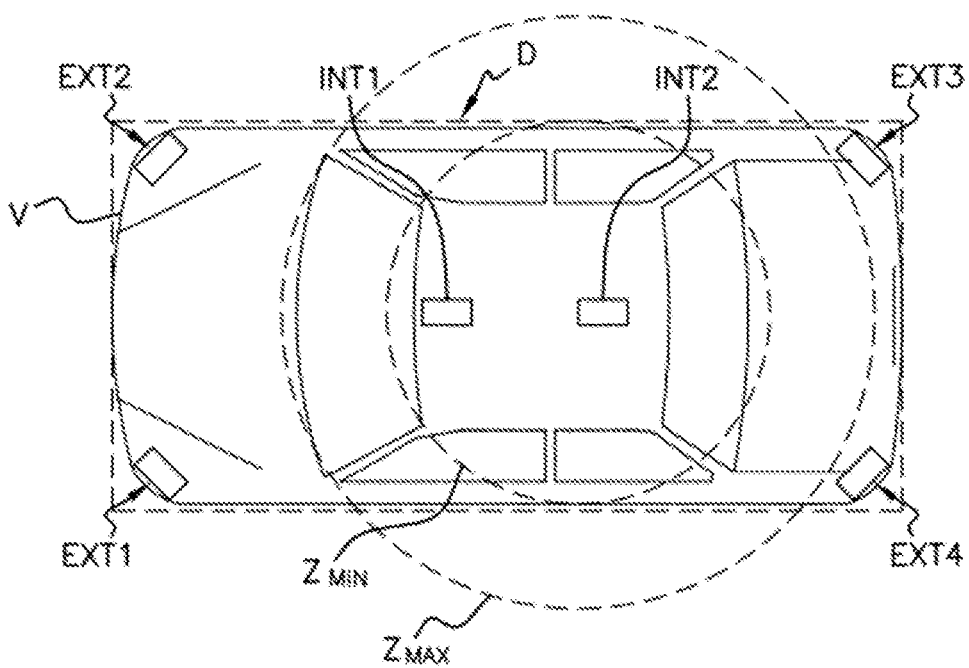
FIG. 2 is a schematic representation of a motor vehicle showing two transmission zones of waves transmitted by an internal module at two different powers.

The impact of transmission power is illustrated in FIG. 2. The area Zmin represents the transmission area of the UWB waves transmitted by the second internal module INT2 with a minimum transmission power Pmin—it is of small size and covers only part of the passenger compartment. The area Zmax, which is larger than the area Zmin, represents the transmission area of the UWB waves transmitted by the second internal module INT2 with a maximum transmission power Pmax—it is of larger size and covers not only the passenger compartment but also part of the bodywork surrounding the passenger compartment of the vehicle V.

Here, for example, a minimum power value Pmin equal to −42 dBm, a maximum power value Pmax equal to −38 dBm, a minimum frequency value Fmin equal to 3.1 GHz, and a maximum frequency value Fmax equal to 10.6 GHz are considered. Of course, these values are in no way limiting.

The transmission characteristics obtained as a function of the frequency and power values of transmission of the ultra-wideband waves are summarized in the following table:

TABLE 1

|  | Minimum power Pmin | Maximum power Pmax |
|---|---|---|
| Minimum frequency Fmin | Large amplitude movement & Small area | Large amplitude movement & Large area |
| Maximum frequency Fmax | Small amplitude movement Small area | Small amplitude movement & Large area |

The applicant therefore proposes, in order to improve detection accuracy:

a. not only to alternate the frequency and power values during transmission by the internal module, b. but also to consider the impact of movements detected outside the vehicle during transmission by the internal module INT1 with the maximum power Pmax (i.e. at a power value at which movements made outside interfere with the reflected waves received by the internal module), by removing them from the CIR profile of the waves received by said internal module by virtue of simultaneous detection of the same movements by the external modules EXT1, EXT2, EXT3, EXT4.

Thus, after the internal module INT1 has transmitted at the minimum power Pmin with two, minimum and maximum, frequency values Fmin, Fmax (E21, E23), and if no presence has been detected (E22, E24) inside the vehicle V, then simultaneously and for the first predetermined period of time T1:

a. the internal module INT1 transmits waves at a maximum power Pmax, at a first frequency value, for example at the minimum frequency Fmin (step E25), and receives the reflected waves, thus determining a profile CIR11c (step E25), b. a first external module, EXT1, transmits UWB waves that are received by a second module EXT4, said second module EXT4 determining a profile CIR14a of the waves thus received (step E11).

Next, the profile CIR14a of the waves received by the second external module EXT4, which represents the outside environment of the vehicle V, is compared with the profile CIR11c received by the internal module CIR11c (step E26), which represents the inside environment of the vehicle V but which is liable to contain interference due to outside events, since the waves were transmitted at a maximum power Pmax.

If an event is detected at the same time simultaneously in both profiles CIR11c and CIR14a, then this event is left out of the profile CIR11c of the internal module to detect a presence inside the vehicle V.

Figure 5A:
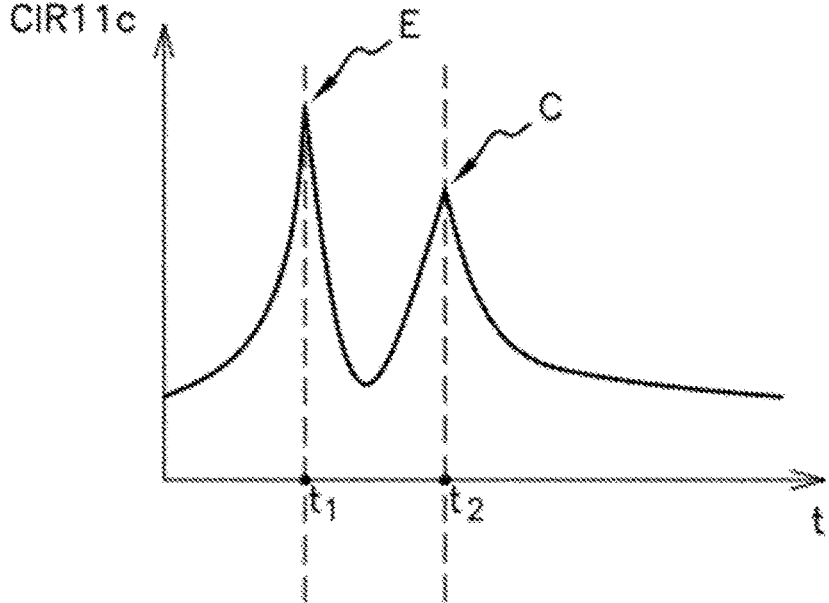
FIG. 5A is a graph showing, as a function of time t, a profile CIR of the waves received by an internal module.
Figure 5B:
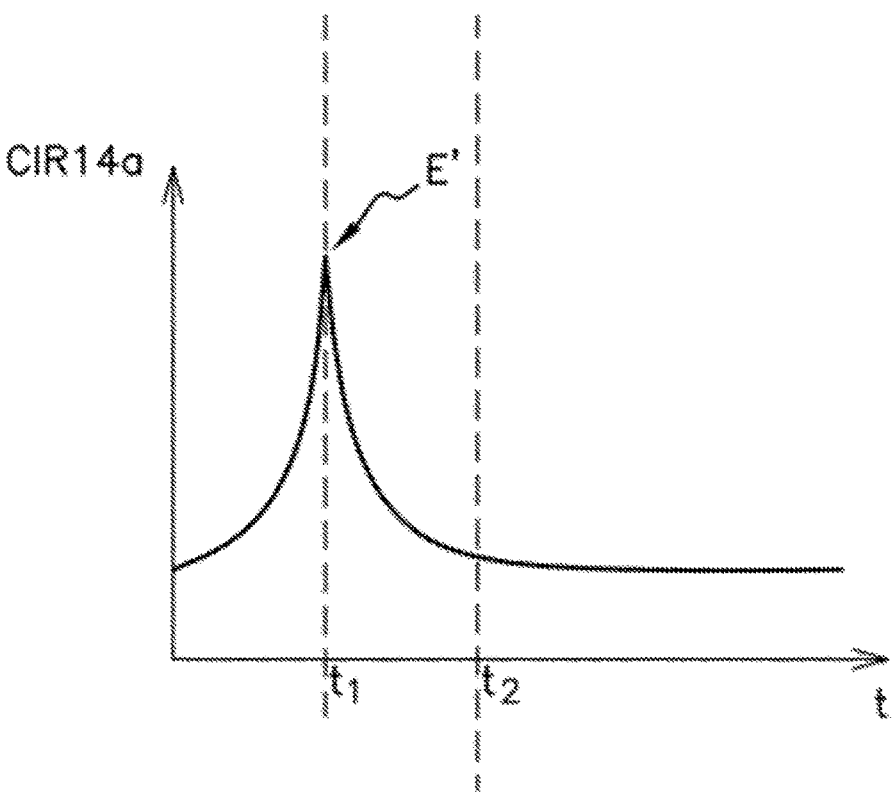
FIG. 5B is a graph showing, as a function of time t, a profile CIR of the waves received by an external module.
Figure 5C:
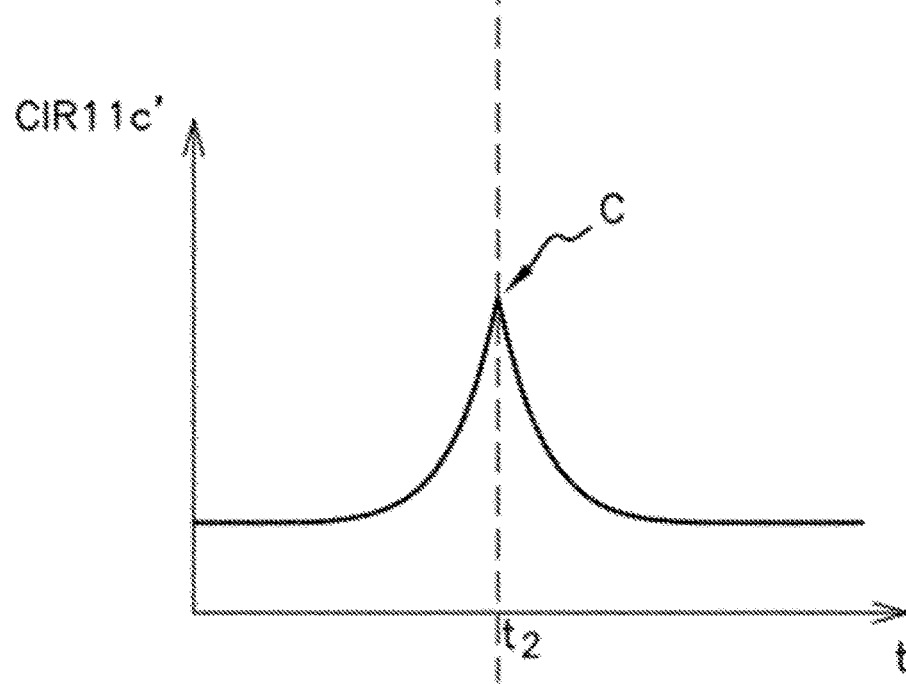
FIG. 5C is a graph showing, as a function of time, a profile CIR of the waves received by the internal module, from which an event detected in the profile CIR of the waves received by the external module has been subtracted, according to the detecting method according to an aspect of the invention.

This is illustrated in FIGS. 5A, 5B, and 5C.

FIG. 5A shows the profile CIR11c of the reflected waves received by the internal module INT1 when the transmitted waves were transmitted with a maximum power Pmax and with a minimum frequency Fmin. The profile CIR11c contains two peaks that are separate in time and that have different amplitudes, a first peak E at the time t1, and a second peak C at the time t2. These two peaks correspond to two distinct events, i.e. to two distinct movements. However, it is not known whether these movements were made inside the vehicle or outside the vehicle.

FIG. 5B shows the profile CIR14a of the waves received by the second external module EXT4 from the first module EXT1, following simultaneous transmission of waves by the first external module EXT1 and the internal module INT1. Since the two external modules EXT1, EXT4 are located on the same left-hand side of the vehicle V, the profile CIR14a thus generated is representative of any movement or presence detected on this left-hand side of the vehicle. Said profile CIR14 contains a peak E' at the time t1.

The profiles CIR11c and CIR14 therefore contain one event E, E' at the same time t1. Any variation in the amplitude of the CIR is called an event.

Since one event is detected simultaneously at the same time t1 in both profiles CIR11c and CIR14, this event is then ignored in the profile CIR11c of the internal module INT1 that is used to detect presence inside the vehicle V, as illustrated in FIG. 5C. In FIG. 5C, the new profile CIR11c' contains only the peak C at the time t2, which peak therefore corresponds to a detection of presence inside the vehicle and not to a parasitic event taking place outside the vehicle V.

Of course, if the new profile CIR11c' contains no peaks, then no presence is detected inside the vehicle V.

Thus, if a presence is detected in this new profile CIR11c' (step E27), then an alarm is delivered to the driver who left the vehicle (step E37b).

Otherwise, if no presence is detected, then steps E25, E26 and E27 are repeated at the maximum frequency Fmax, for transmission by the internal module INT1 (step E28). Similarly, the internal module INT1 and the first external module EXT1 simultaneously transmit UWB waves for the same first predetermined period of time T1. Next, the profile CIR11d of the reflected waves that the internal module INT1 receives (step E28) is compared (step E29) with the profile CIR14b of the waves received by the second external module EXT4 (step E13) that were transmitted by the first external module EXT1.

If an event E, E' is detected simultaneously in both profiles, this event is then ignored or subtracted from the profile CIR11d of the internal module INT1 to detect presence inside the vehicle V.

If a presence is detected, the alarm is raised (step E37b), otherwise steps E25 to E30 (i.e. alternation of transmission at a maximum power Pmax and at two frequency values Fmin, Fmax) are repeated but this time for a second predetermined period of time T2, longer than the first predetermined period of time T1, of value equal for example to 2 seconds.

If no presence has been detected at the end of the preceding steps, the detecting method is then repeated, the waves being transmitted for a longer time, and only with a maximum power value Pmax.

A second predetermined period of time T2 of longer length than the first predetermined period of time T1 makes it possible to detect a complete breathing cycle, containing one inhalation and one exhalation. The first predetermined period of time T1 is more suitable for detecting movement of a limb such as movement of an arm, and the second predetermined period of time T2 is more suitable for detecting movement due to breathing, when the preceding steps carried out with the first predetermined period of time T1 have not detected any body movement inside the passenger compartment.

Thus, in step E31, the internal module INT1 transmits, for a second predetermined period of time T2, waves that are mainly directed toward inside the vehicle V (but which may be interfered with by events located outside the vehicle), in UWB at the maximum power Pmax and at the minimum frequency Fmin.

Simultaneously with this transmission, the first external module EXT1 also transmits UWB waves that are directed toward outside the vehicle V.

The profile CIR11A of the reflected waves received by the internal module INT1 is compared with the profile CIR14A of the waves received by the second external module EXT4 (step E32). If an event is detected (step E33) simultaneously in both profiles CIR11A, CIR14A, then the peak corresponding to said event is removed from the profile CIR11A of the internal module INT1, to detect presence inside the vehicle V.

If presence is detected the alarm is raised (step E37b), but if no presence is detected then steps E31, E32, E33 are repeated but this time with a minimum frequency Fmin. The two, internal and external, modules INT1, EXT1 transmit simultaneously (steps E34 and E15), and the profiles CIR11B and CIR14B of the internal module INT1 and of the second external module EXT4 are compared (step E35).

If at the end of this comparison, if no presence is detected (step E36) inside the vehicle V, then the method stops (step E37a), otherwise the alarm is raised (step E37b).

In a second embodiment of the method according to the invention, during transmission of waves by the internal module INT1, the two external modules EXT1, EXT4 located on the same side of the vehicle V transmit waves simultaneously. Each of the external modules receives waves from the other external module and the CIR profiles of the two external modules are summed to produce a single CIR profile. Said CIR profile generated by summing two CIR profiles of external modules is then compared with the CIR profile of the internal module.

In the case where the vehicle comprises four external modules EXT1, EXT2, EXT3, EXT4, then all the external modules transmit waves simultaneously to the internal module. All the CIR profiles of the external modules CR14, CIR41, CIR43, CIR34, CIR23, CIR32, CIR12, CIR21 (cf. FIG. 1) are combined, and summed to produce a single CIR profile that is then compared to the CIR profile of the internal module. Thus, the whole outside of the vehicle is "probed" by virtue of transmission by the external modules, and any movement or presence around the vehicle can be detected, considered as a parasitic event in the CIR profile of the internal module, and therefore removed from said profile, to detect presence inside the vehicle.

In a third embodiment of the method according to the invention, during transmission by the at least one external module EXT1, EXT2, EXT3, EXT4, the transmission is at the same frequency as that used by the internal module INT1. Thus, if the internal module INT1 transmits at the minimum frequency Fmin, then the simultaneous transmission by at least one external module is carried out at the same minimum frequency Fmin. Similarly, if the internal module INT1 transmits at the maximum frequency Fmax, then the simultaneous transmission by at least one external module is carried out at the same maximum frequency Fmax. This allows the same detection sensitivity to be obtained for the internal module and the external module, and the reliability and accuracy of presence detection to be improved.

An aspect of the invention therefore ingeniously proposes to use the ultra-wideband communication modules already present in the vehicle for hands-free access to detect presence inside a locked vehicle. The ingenuity of the invention lies in the alternation of transmission of waves by the internal module at different frequency and power values, while taking account of events potentially taking place outside the vehicle, which are detected by virtue of the external modules, and which interfere with the detection by the internal module when the latter transmits at high power.

An aspect of the invention is particularly judicious insofar as it requires only additional software means, and therefore means that are of low cost.

The invention claimed is:

1. A method for detecting presence inside a locked vehicle, by a detecting device comprising at least one internal ultra-wideband transceiver module able to transmit toward inside the vehicle and at least two external ultra-wideband transceiver modules able to transmit toward outside the vehicle, said method comprising:
   a) detection of locking of the vehicle;
   b) for a first predetermined period of time, alternation of transmission by the at least one internal ultra-wideband transceiver module of waves at various predetermined frequencies and at various associated predetermined powers, and simultaneous transmission of waves by a first external ultra-wideband transceiver module of the at least two external ultra-wideband transceiver modules, the various predetermined frequencies including a first predetermined frequency and a first predetermined power value, and a second predetermined frequency and a second predetermined power value, and wherein the alternation by the at least one internal ultra-wide transceiver module of waves at the various predetermined frequencies and the various associated predetermined power includes transmission at the first predetermined frequency and the first predetermined power value, and repeated at a different frequency and power value, the different frequency and power value being at least one of the second predetermined frequency and the second predetermined power value,
   c) reception, by the at least one internal ultra-wideband transceiver module, of reflected waves,
   d) reception, by a second external ultra-wideband transceiver module of the at least two external ultra-wideband transceiver module, of waves transmitted by said first external ultra-wideband transceiver module,
   e) comparison between the reflected waves received by the at least one internal ultra-wideband transceiver module and the waves received by the second external ultra-wideband transceiver module, and f) in case of simultaneous detection by the at least one internal ultra-wideband transceiver module and by the second external ultra-wideband transceiver module of an event, then detection of presence inside the vehicle using the reflected waves of the at least one internal ultra-wideband transceiver module from which the waves corresponding to the detected event are subtracted.

2. The detecting method as claimed claim 1, wherein the simultaneous detection of an event corresponds to detection, by the at least one internal ultra-wideband transceiver module and by the second external ultra-wideband transceiver module, of a wave variation at the same time.

3. The detecting method as claimed in claim 1, wherein transmission by the at least one internal ultra-wideband transceiver module is repeated at the various predetermined power values and the at various associated predetermined frequencies and in that the comparison is performed only for waves transmitted at maximum power values.

4. The detecting method as claimed in claim 1, wherein in case of absence of detection, the method is repeated with transmission of waves by the at least one internal ultra-wideband transceiver module for a second predetermined period of time longer than the first predetermined period of time, and only at a maximum power value.

5. The detecting method as claimed in claim 1, wherein the transmission of waves by the at least two external ultra-wideband transceiver modules is carried out at a power equal to the transmission power of the at least one internal ultra-wideband transceiver module.

6. The detecting method as claimed in claim 1, wherein the method also comprises simultaneous transmission by the second external ultra-wideband transceiver module of waves and reception by the first external ultra-wideband transceiver module of the waves thus transmitted and wherein the comparison is made between the reflected waves received by the at least one internal ultra-wideband transceiver module and a sum consisting of the waves received by the first external ultra-wideband transceiver module and of the waves received by the second external ultra-wideband transceiver module.

7. A computer program product, comprising a set of program-code instructions that, when they are executed by one or more processors, configure the one or more processors to implement a method as claimed in claim 1.

8. The detecting method as claimed in claim 1, wherein the at least one internal ultra-wideband transceiver module is configured to transmit ultra-wideband waves at 3.1 GHz and 10.6 GHz spanning a frequency range of 500 MHZ, and the at least two external ultra-wideband transceiver modules are configured to transmit ultra-wideband waves at 3.1 GHz and 10.6 GHZ spanning a frequency range of 500 MHz.

9. A device for detecting presence inside a vehicle comprising at least one internal ultra-wideband transceiver module able to transmit toward inside the vehicle and at least two external ultra-wideband transceiver modules able to transmit toward outside the vehicle, wherein the at least one internal ultra-wideband transceiver module and the at least two external ultra-wideband transceiver modules are each able to determine a profile of received waves, the at least one internal ultra-wideband transceiver module is able to alternate transmission of waves at various predetermined power values and frequencies, the various predetermined power values and frequencies including a first predetermined frequency and a first predetermined power value, and a second predetermined frequency and a second predetermined power value, wherein the alternate transmission of the waves at the various predetermined power values and frequencies by the at least one internal ultra-wide transceiver module includes transmission at the first predetermined frequency and the first predetermined power value, and repeated at a different frequency and power value, the different frequency and power value being at least one of the second predetermined frequency and the second predetermined power value, and the device further comprises:

a) means for detecting locking of the vehicle,
    b) means for synchronizing transmission by the at least one internal ultra-wideband transceiver module and transmission by at least a first external module of the at least two external ultra-wideband transceiver modules,
    c) means for making a comparison between waves received by the at least one internal ultra-wideband transceiver module and waves received by at least a second external module of the at least two external ultra-wideband transceiver modules, and
    d) means for detecting presence inside the vehicle depending on the result of the comparison.

10. The detecting device as claimed in claim 9, wherein the predetermined frequencies are minimum and maximum frequencies and wherein the predetermined power values are minimum and maximum power values.

11. The detecting device as claimed in claim 9, further comprising a plurality of external modules and means for summing the waves received by the at least two external ultra-wideband transceiver modules and the comparison-making means compare the waves received by the internal module with a sum of the waves received by the at least two external ultra-wideband transceiver modules.

12. A motor vehicle, comprising a detecting device as claimed in claim 9.

13. The detecting device as claimed in claim 9, wherein the at least one internal ultra-wideband transceiver module is configured to transmit ultra-wideband waves at 3.1 GHz and 10.6 GHz spanning a frequency range of 500 MHZ, and the at least two external ultra-wideband transceiver modules are configured to transmit ultra-wideband waves at 3.1 GHz and 10.6 GHz spanning a frequency range of 500 MHz.

* * * * *